(12) United States Patent
Kavuri et al.

(10) Patent No.: US 7,917,473 B2
(45) Date of Patent: Mar. 29, 2011

(54) SYSTEMS AND METHODS OF HIERARCHICAL STORAGE MANAGEMENT, SUCH AS GLOBAL MANAGEMENT OF STORAGE OPERATIONS

(75) Inventors: Srinivas Kavuri, Hyderabad (IN); Rajiv Kottomtharayil, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 430 days.

(21) Appl. No.: 12/060,186

(22) Filed: Mar. 31, 2008

(65) Prior Publication Data
US 2008/0250204 A1 Oct. 9, 2008

Related U.S. Application Data

(63) Continuation of application No. 11/982,324, filed on Oct. 31, 2007.

(60) Provisional application No. 60/871,734, filed on Dec. 22, 2006.

(51) Int. Cl.
G06F 7/00 (2006.01)
G06F 17/00 (2006.01)

(52) U.S. Cl. ......... 707/651; 707/654; 707/665; 707/694

(58) Field of Classification Search .................. 707/651, 707/654, 665, 694
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |

(Continued)

FOREIGN PATENT DOCUMENTS

EP 0259912 3/1988

(Continued)

OTHER PUBLICATIONS

Gonzalez-Seco, J.; , "A genetic algorithm as the learning procedure for neural networks," Neural Networks, 1992. IJCNN., International Joint Conference on , vol. 1, No. pp. 835-840 vol. 1, Jun. 7-11, 1992 doi: 10.1109/IJCNN.1992.287083 URL: http://ieeexplore.ieee.org/stamp/stamp.jsp?tp=&arnumber=287083&isnumber=7149.*

(Continued)

*Primary Examiner* — John Breene
*Assistant Examiner* — Mark E. Hershley
(74) *Attorney, Agent, or Firm* — Perkins Coie LLP

(57) ABSTRACT

A system and method for setting global actions in a data storage system is described. In some examples, the system determines a policy based on information from the system, and implements that policy to the system. In some examples, the system adds or modifies global filters based on information from the system.

10 Claims, 12 Drawing Sheets

U.S. PATENT DOCUMENTS

| | | |
|---|---|---|
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A * | 9/1998 | Johnson et al. ............... 707/695 |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,978,577 A * | 11/1999 | Rierden et al. .......................... 1/1 |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,484,166 B1 * | 11/2002 | Maynard ....................... 707/694 |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,370 B2 | 9/2005 | Boies et al. |
| 7,006,435 B1 * | 2/2006 | Davies et al. ................ 370/230 |
| 7,209,949 B2 * | 4/2007 | Mousseau et al. ............ 709/206 |
| 7,281,032 B2 | 10/2007 | Kodama |
| 7,343,453 B2 | 3/2008 | Prahlad et al. |
| 7,343,459 B2 | 3/2008 | Prahlad et al. |
| 7,346,751 B2 | 3/2008 | Prahlad et al. |
| 7,500,053 B1 | 3/2009 | Kavuri et al. |
| 7,539,702 B2 | 5/2009 | Deshmukh et al. |
| 7,581,011 B2 * | 8/2009 | Teng .............................. 709/229 |
| 7,644,245 B2 | 1/2010 | Prahlad et al. |
| 7,805,416 B1 * | 9/2010 | Compton et al. ............. 707/694 |
| 7,809,699 B2 * | 10/2010 | Passmore et al. ............. 707/694 |
| 2003/0220901 A1 | 11/2003 | Carr et al. |
| 2004/0204949 A1 * | 10/2004 | Shaji et al. ........................ 705/1 |
| 2005/0008163 A1 * | 1/2005 | Leser et al. .................... 380/281 |
| 2005/0028006 A1 * | 2/2005 | Leser et al. .................... 713/200 |
| 2006/0095525 A1 * | 5/2006 | Mousseau et al. ............ 709/206 |
| 2006/0182034 A1 * | 8/2006 | Klinker et al. ................. 370/238 |
| 2006/0248165 A1 * | 11/2006 | Sridhar et al. ................. 709/218 |
| 2007/0130105 A1 | 6/2007 | Papatla |
| 2007/0156897 A1 * | 7/2007 | Lim ............................... 709/225 |
| 2007/0174233 A1 | 7/2007 | Ginis et al. |
| 2007/0185912 A1 | 8/2007 | Gupta et al. |
| 2007/0198802 A1 * | 8/2007 | Kavuri .......................... 711/170 |
| 2008/0059704 A1 | 3/2008 | Kavuri |
| 2008/0201343 A1 | 8/2008 | Crescenti et al. |
| 2008/0244177 A1 | 10/2008 | Crescenti et al. |
| 2008/0249996 A1 | 10/2008 | Prahlad et al. |
| 2009/0157881 A1 | 6/2009 | Kavuri et al. |
| 2010/0138393 A1 | 6/2010 | Crescenti et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

U.S. Appl. No. 11/982,324, filed Oct. 31, 2007, Kavuri et al.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

* cited by examiner

SYSTEMS AND METHODS OF HIERARCHICAL STORAGE MANAGEMENT, SUCH AS GLOBAL MANAGEMENT OF STORAGE OPERATIONS

CROSS-REFERENCE TO RELATED APPLICATION(S)

This is a continuation application of U.S. application Ser. No. 11/982,324, filed Oct. 31, 2007, entitled SYSTEMS AND METHODS OF HIERARCHICAL STORAGE MANAGEMENT, SUCH AS GLOBAL MANAGEMENT OF STORAGE OPERATIONS which claims the benefit of U.S. Provisional Patent Application No. 60/871,734, filed on Dec. 22, 2006, entitled SYSTEMS AND METHODS OF HIERARCHICAL STORAGE MANAGEMENT, SUCH AS GLOBAL MANAGEMENT OF STORAGE OPERATIONS, each of which is incorporated by reference in its entirety.

This application is related to the following patents and pending U.S. applications, each of which is incorporated by reference in its entirety: U.S. patent application Ser. No. 11/120,619, filed May 2, 2005, entitled "HIERARCHICAL SYSTEMS AND METHODS FOR PROVIDING A UNIFIED VIEW OF STORAGE INFORMATION".

BACKGROUND

Systems used to perform data storage operations of electronic data are growing in complexity. Often, these systems are required to transfer and/or store large amounts of data during specific and rigid "backup windows" that typically run on a daily or weekly basis. Because these data storage windows are limited in length (e.g., a time period of 6 PM to 6 AM so as not to interfere with work hours), data storage systems must accommodate storing larger and larger amounts of data without increasing the duration of their operations.

Data storage operations commonly rely on networked and other complex systems, where transfers and other operations occur at different places, at different times, and for different needs. Hierarchical systems may be used, where various storage components are linked to one another and to the system via a storage management component. Some of the components may provide filtering capabilities for lower components in the hierarchy. Systems may then use these storage management components to operate or "oversee" the system and its various components. However, many of the management components are used simply to manage and collect data from the various components.

The foregoing examples of some existing limitations are intended to be illustrative and not exclusive. Other limitations will become apparent to those of skill in the art upon a reading of the Detailed Description below. These and other problems may exist with respect to data storage systems.

Figure 1:
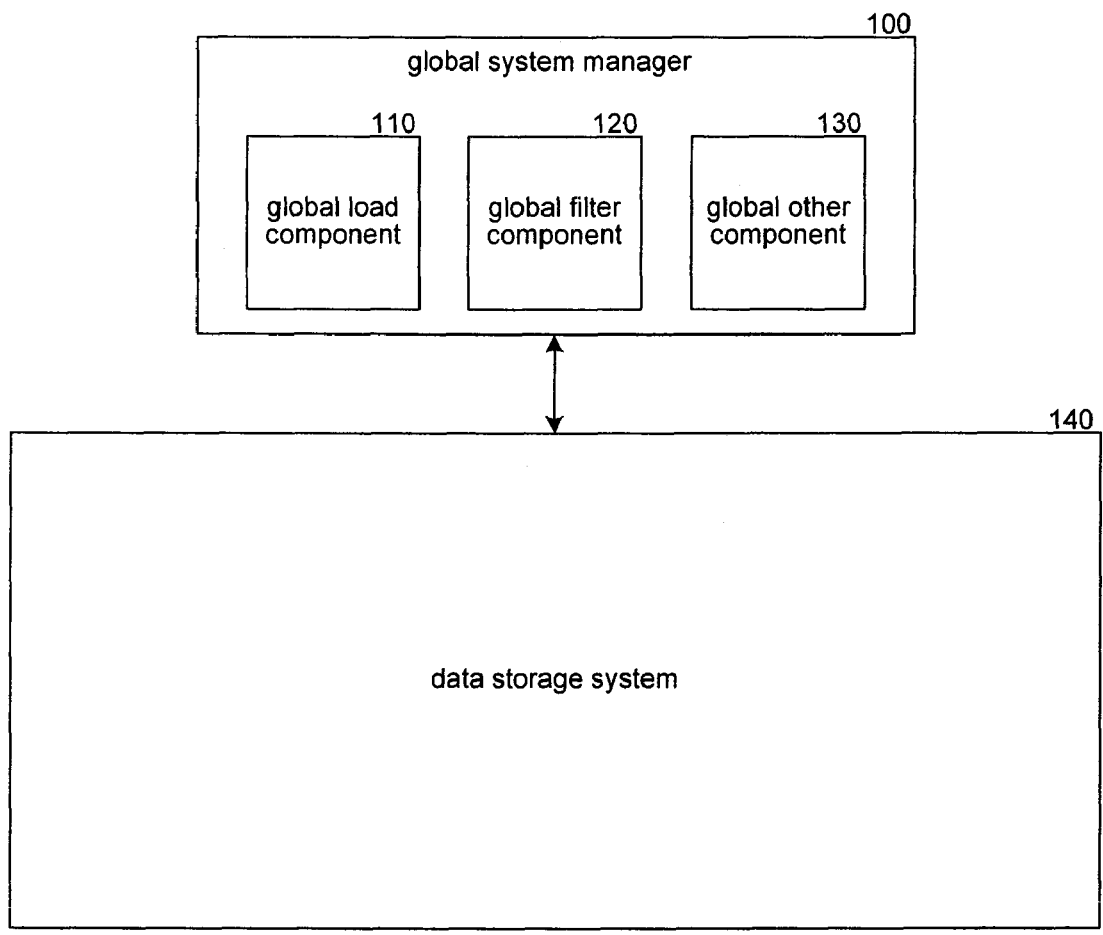
FIG. 1 is a block diagram illustrating a global system server.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 810 is first introduced and discussed with respect to FIG. 8).

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology are concerned with systems and methods that monitor, control, or update data storage systems and their operations. Although described in connection with certain examples, the system described below is applicable to and may employ any wireless or hard-wired network or data storage system that stores and conveys data from one point to another, including communication networks, enterprise networks, storage networks, and so on.

Examples of the technology provide systems, such as hierarchical data systems, that determine and perform actions in response to reports and information obtained from and/or during data storage operations. The systems may monitor the storage of data for a given period and modify or redistribute storage operations based on results obtained during the monitoring period. The system may modify storage operations during the monitoring, or may use obtained information to modify future storage operations. A hierarchical system may be a system comprising a minimum of two components, where one of the components manages at least part of the other component.

For example, the system receives a report of a data transfer load, the report indicating, for a given sample time, the number of individual storage operations (e.g., number of "jobs") running with respect to the number of jobs waiting to be performed. The system may use this information and redistribute the jobs to more data pipelines (e.g., pathways to storage devices for the jobs), reducing the number of stagnant or waiting jobs. In some cases, the system may redistribute the storage operations during a running data storage operation. In some cases, the system may use the report to redistribute system resources for a later data storage operation.

In some cases, data storage systems utilize tens or hundreds of dedicated servers when performing a data transfer (such as the daily backup operation described above). In these cases, the system may implement global policies, rules, and/or filters that apply to the servers, enabling system operations to set policies for a system without resetting each individual server.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating a global system server, or manager, 100 may interact with a number of different data storage systems 140. Some examples of data storage systems will be discussed with respect to FIGS. 3 and 4. Global manager 100 may include components such as a global load component 110, a global filter component 120, or other global components 130. Components 110, 120 and/or 130 act to receive, transmit, monitor, or control data processes and system resources within the data storage system 140.

Figure 2:
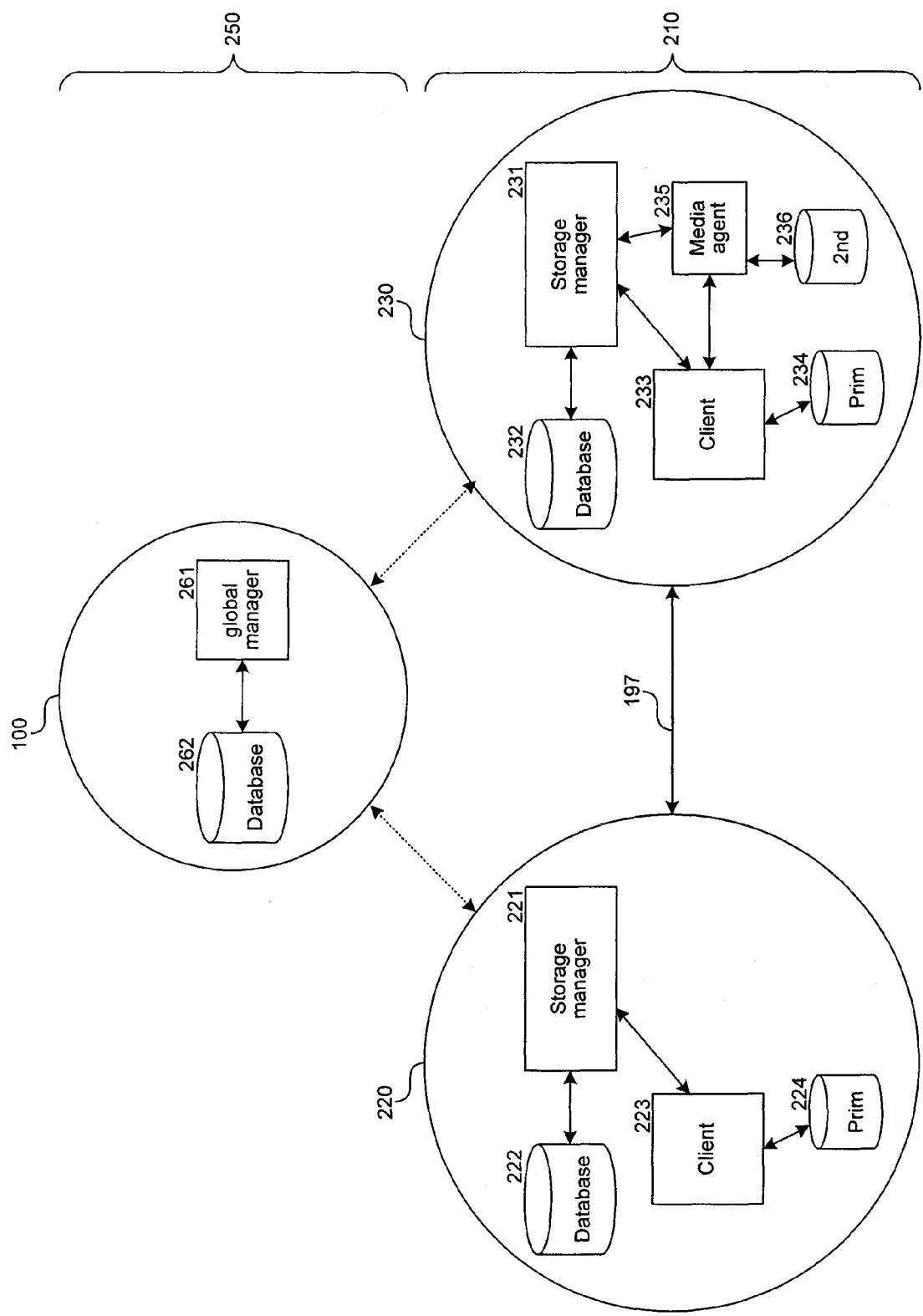
FIG. 2 is a block diagram illustrating a hierarchical data storage system.

Referring to FIG. 2, a block diagram illustrating a hierarchical data storage system comprises two levels: a storage operations level 210 and a global level 250. The global level 250 may contain a global operations cell 260, which may contain a global manager 100 and a database 262. The storage operations level 210 may contain storage operations cells, such as cells 220 and 230. Cells 220 and 230 may always perform specified data storage operations, or may perform varied data storage operations that depend on the needs of the system.

Cell 220 contains components used in data storage operations, such as a storage manager 221, a database 222, a client 223, and a primary storage database 224. Cell 230 may contain similar components, such as storage manager 231, a database 232, a client 233, and a primary storage database 234. In this example, cell 230 also contains media agent 235 and secondary database 236. Both cells 220 and 230 communicate with global manager 100, providing information related to the data storage operations of their respective cells. Storage manager 231 may migrate primary copy data from primary storage database 234 to secondary storage database 236 using media agent 235.

Figure 3:
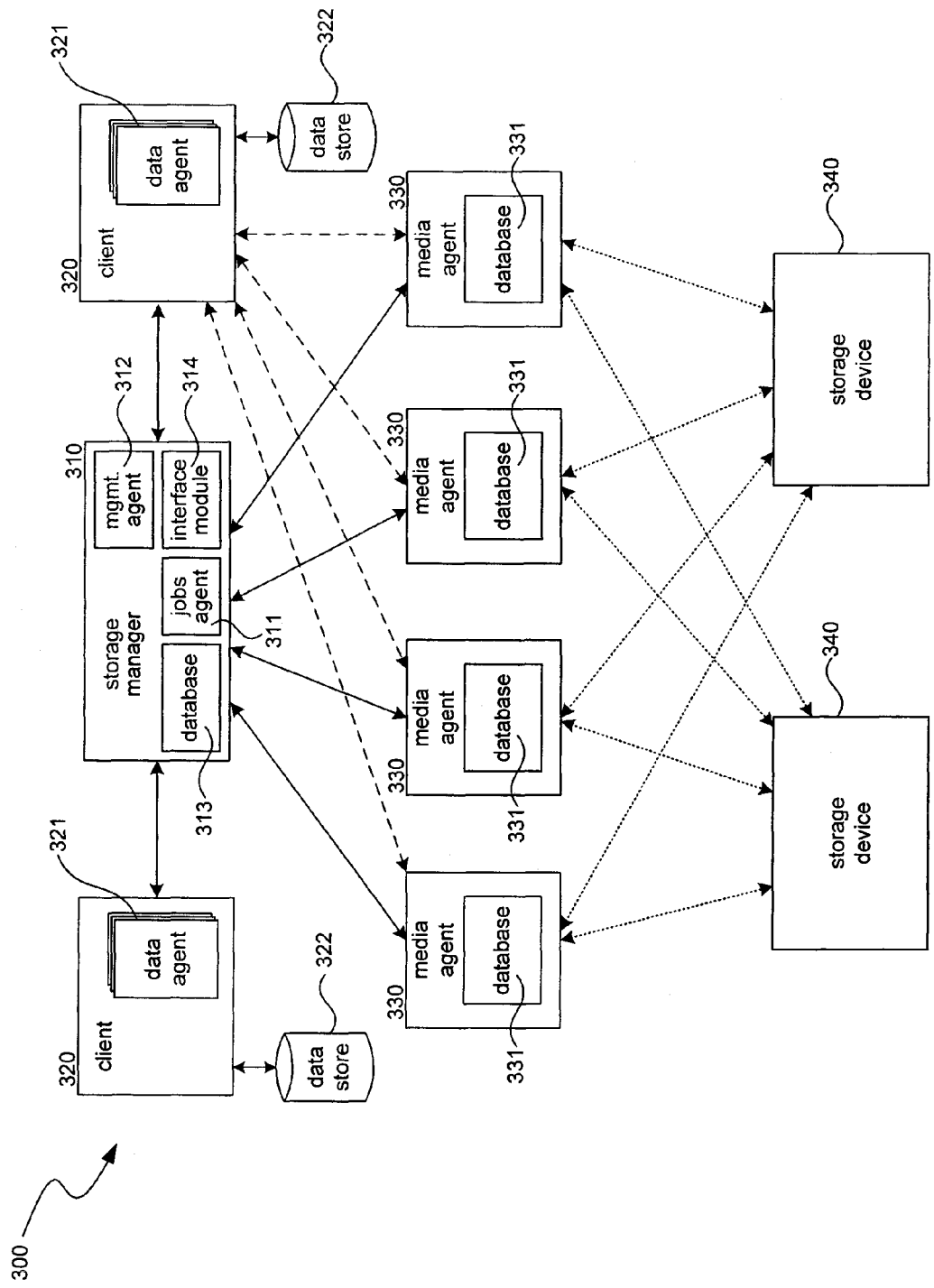
FIG. 3 is a block diagram illustrating components of a storage operations cell.

Referring to FIG. 3, a block diagram illustrating components of a storage operations cell is shown. Storage operations cells (such as cells 220 or 230 of FIG. 2) may contain some or all of the following components, depending on the use of the cell and the needs of the system.

For example, cell 300 contains a storage manager 310, clients 320, multiple media agents 330, and multiple storage devices 340. Storage manager 310 controls media agents 330, which are responsible, at least in part, for transferring data to storage devices 340. Storage manager 310 includes a jobs agent 311, a management agent 312, a database 313, and an interface module 314. Storage manager 310 communicates with client 320. Client 320 accesses data to be stored by the system from database 322 via a data agent 321. The system uses media agents 330, which contain databases 331, to transfer and store data into storage devices 340. Generally speaking, a media agent 330 may be implemented as a software module that conveys data, as directed by a storage manager 310, between a client computer 320 and one or more storage devices 340 such as a tape library, a magnetic media storage device, an optical media storage device, or any other suitable storage device. Storage manager may migrate primary copy data from a primary volume to a secondary volume using media agent. Storage manager 196 may also track and store information associated with primary copy migration and other similar HSM-related operations in a storage manager database. For example, in some embodiments, a storage manager component may direct HSM storage operations on primary copy data according to according to a storage policy associated with the primary copy and stored in the index. In some embodiments, storage manager may also track where primary copy information is stored, for example in secondary storage.

Cells 300 may include software and/or hardware components and modules used in data storage operations. The cells 300 may be transfer cells that function to transfer data during data store operations. The cells 300 may perform other storage operations (or storage management operations) other that operations used in data transfers. For example, cells 300 may perform creating, storing, retrieving, and/or migrating primary and secondary data copies. The data copies may include snapshot copies, backup copies, HSM copies, archive copies, and so on. The cells 300 may also perform storage management functions that may push information to higher level cells, including global manager cells.

In some examples, the system performs storage operations based on storage policies. A storage policy may be, for example, a data structure that includes a set of preferences or other criteria considered during storage operations. The storage policy may determine or define a storage location, a relationship between components, network pathways, accessible datapipes, retention schemes, compression or encryption requirements, preferred components, preferred storage devices or media, and so on. Storage policies may be stored in storage manager 310, 221, 231, or may be stored in global manager 261 as discussed above.

Additionally or alternatively, the system may implement or utilize schedule policies. A schedule policy may specify when to perform storage operations, how often to perform storage operations, and so on. The schedule policy may also define the use of sub-clients, where one type of data (such as email data) is stored using one sub-client, and another type of data (such as database data) is stored using another sub-client. In these cases, storage operations related to specific data types (email, database, and so on) may be distributed between cells.

Figure 4:
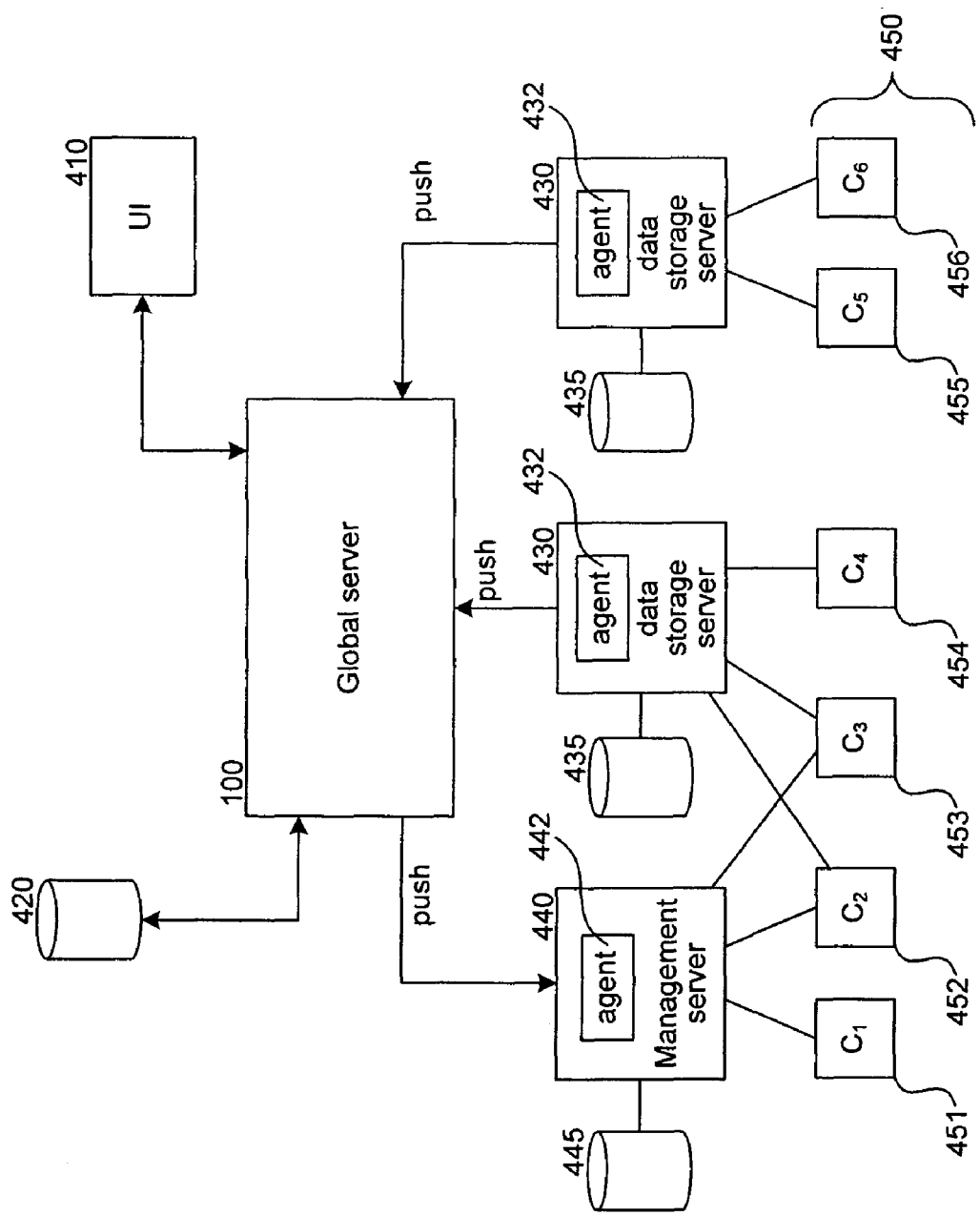
FIG. 4 is a block diagram illustrating interaction between a global cell and data storage cells.

Referring to FIG. 4, a block diagram illustrating interaction between the global cell and data storage cells is shown. Global server 100, which may contain global load components, global filer components, and other components configured to determine actions based on received data storage information, may communicate with a database 420 and a user interface 410. Database 420 may store storage policies, schedule policies, received sample data, other storage operation information, and so on. User interface 410 may display system information to a user. Further details with respect to the user interface display are discussed below.

Global server 100 may push data to a management server 442. Server 442 communicates with a database 445 and clients 451, 452 and/or 453. Data storage servers 430 push data to the global server 100, and contain data agents 432 and databases 435. These servers may communicate with clients 454, 455, and/or 456.

Global server 100 is able to perform actions (such as redistributing storage operations), and apply these actions to the data storage system via a management server. Global server 100 receives information used to determine the actions from the storage servers 430. In this example, the global server acts as a hub in the data storage system by sending information to modify data storage operations and monitoring the data storage operations to determine how to improve the operations.

Load Reports and Associated Actions

Reports that sample data transfers provide meaningful information to the global manager. Using this information, the global manager (via component 110 or other similar components) may determine actions to be performed. Some of these actions may include redistributing data store operations, transferring operations from one resource to another, defining future storage policies, and so on.

Figure 5:
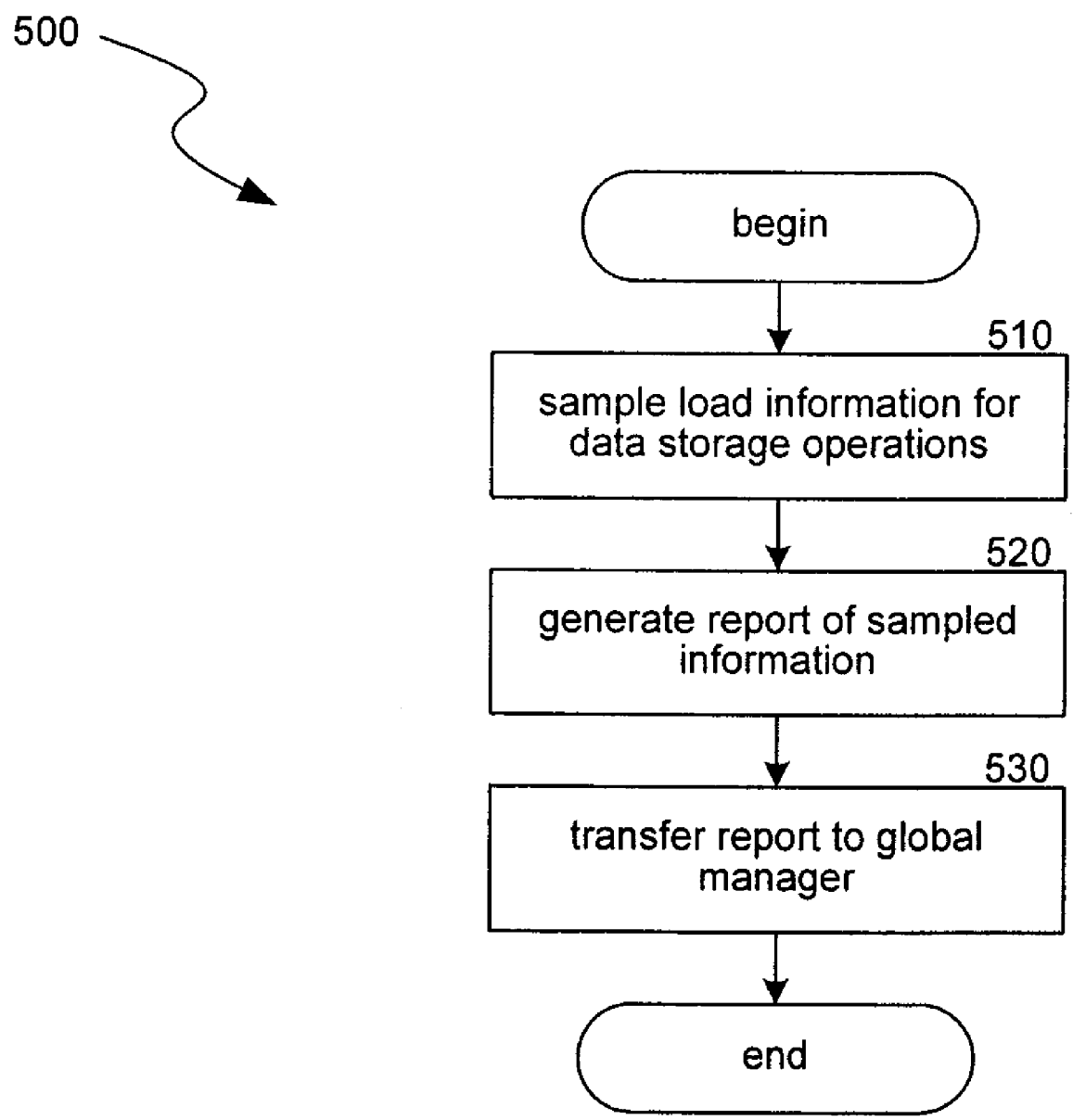
FIG. 5 is a flow diagram illustrating sending an example load report to a global manager or server.

Referring to FIG. 5, a flow diagram illustrating a routine 500 provides an example of a load report for a global manager or server. In step 510, the system samples load information from running data storage operations. For example, the system may sample the number of transferring jobs, the number of waiting jobs, the number of data streams for a specific media agent, and so on. Agents at some or all cells may be configured to gather and log data which is then sent to generate the load report. In step 520, the system generates a report containing some or all of the sampled information. The report may contain the information as sampled, or may provide analysis or algorithmically generated information for the sampled information. For example, the system may obtain certain data and perform certain statistical analysis with respect to the data, like determining a mean and/or standard deviation. In step 530, the system transfers the report to a global manager 100.

A load report may be a comprehensive report that covers an entire system. That is, the report may sample information from all cell and storage systems. The load report may also cover any combination of storage cells, components, and/or systems.

Figure 6:
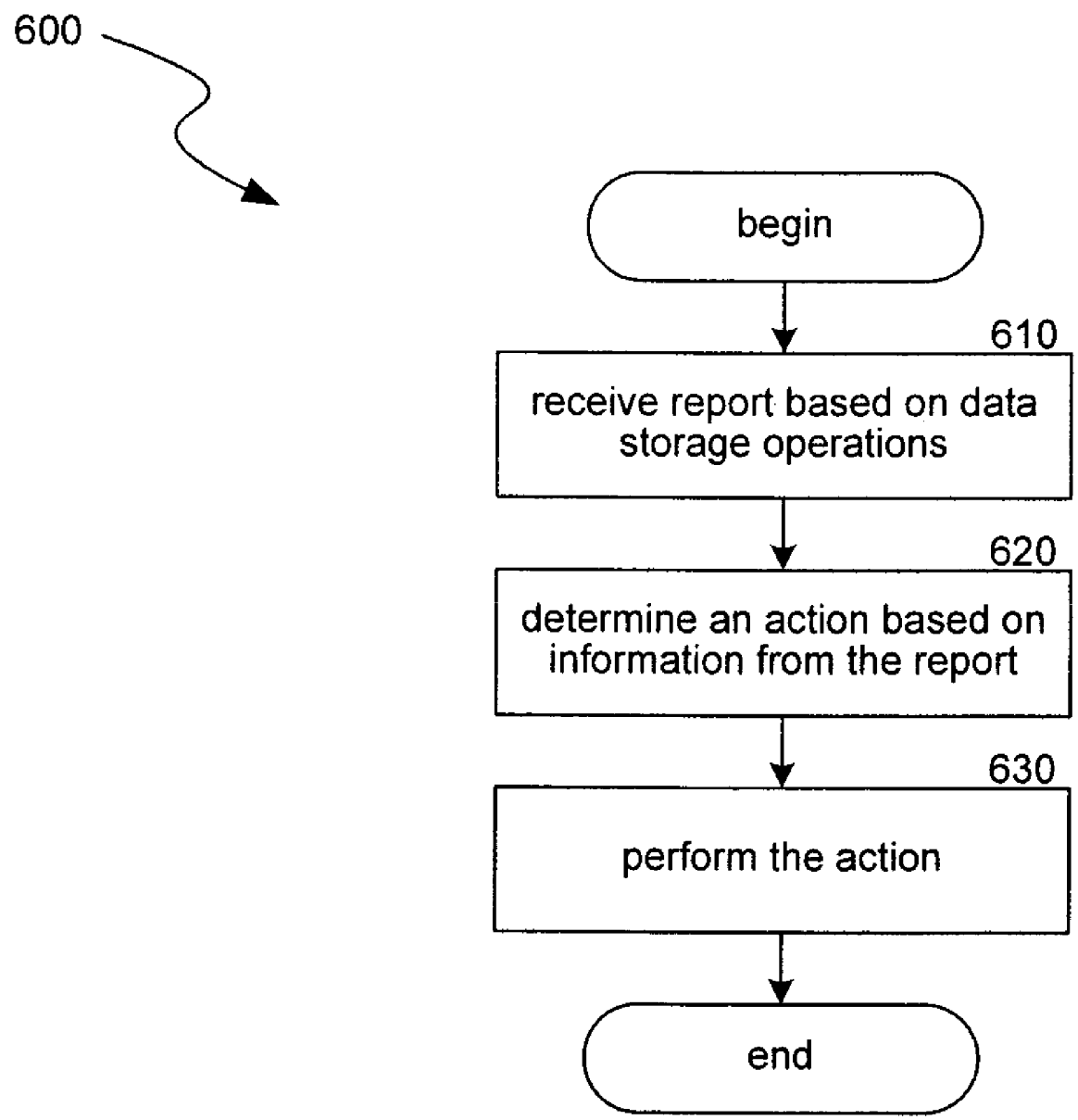
FIG. 6 is a flow diagram illustrating a routine for performing an action based on a load report.

Referring to FIG. 6, a flow diagram illustrating a routine 600 for performing an action based on the load report is shown. In step 610, the system receives the load report that contains information related to data storage operations. The system may receive a report that provides information on running operations, or may receive a report that provides information on completed operations (such as a previous night's operation information). For example, the report may provide information related to the number of jobs completed, running, and waiting, at a given cell.

Figure 7A:
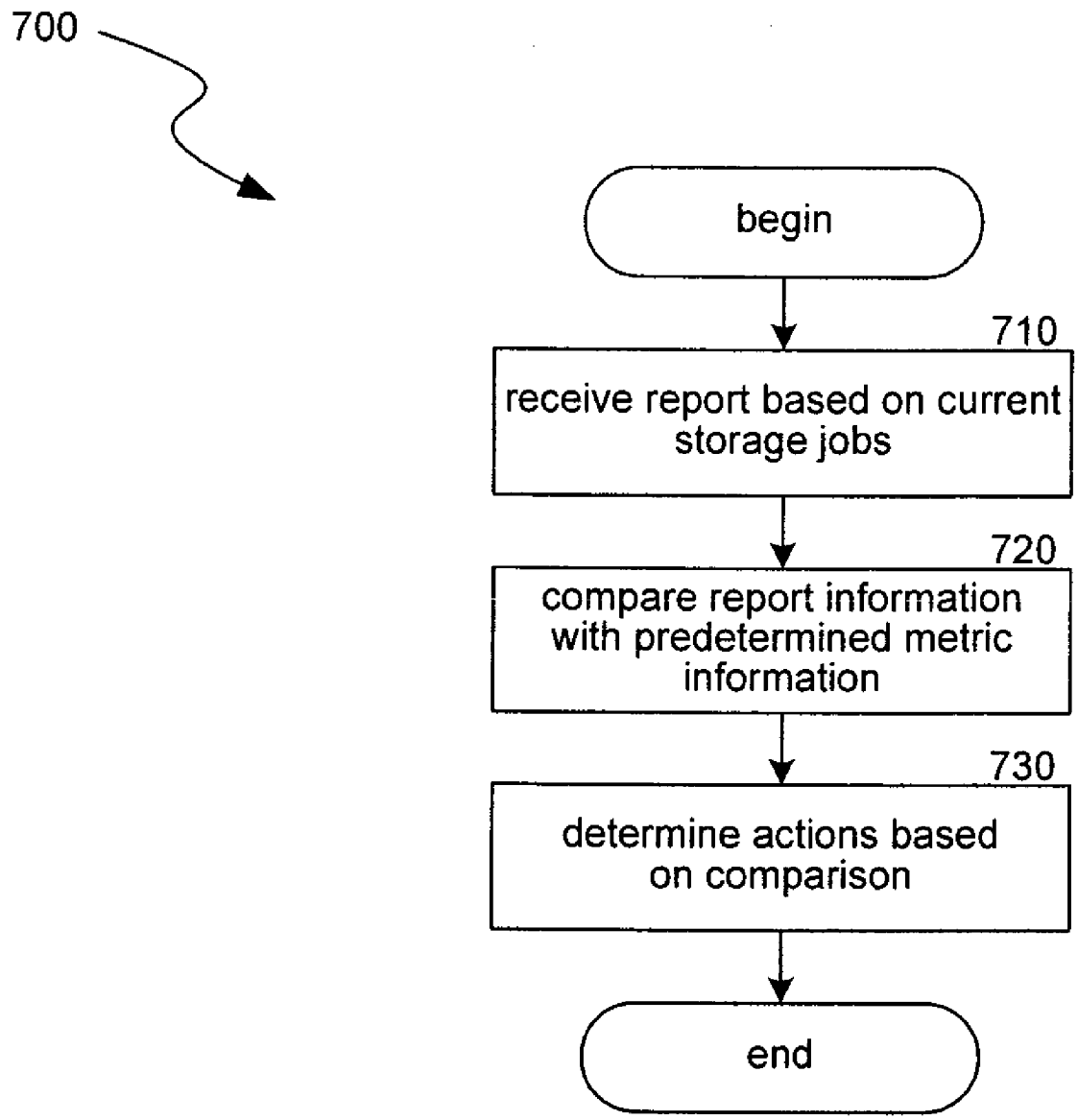
FIG. 7A is a flow diagram illustrating a routine for determining an action.

Upon receiving a report or reports, the system, in step 620, determines an action to be performed based on the report. Referring to FIG. 7A, a flow diagram illustrating a routine 700 for determining an action is shown. In step 710, the system receives a report based on data storage operations. The system, in step 720, compares information from the report to one or more known or preferred metrics for the sampled storage operations.

For example, the system may determine a resource usage factor as the mean or median number of jobs transferring data during a data storage window or period. The system may then compare a determined usage factor to a maximum usage factor (a total number of jobs possible given the number and type of data storage resources in the global system). The system may use the comparison to determine how the sampled storage operation cell is performing and whether the cell is reaching its capacity limits as far as resource usage is concerned.

Additionally or alternatively, the system may determine a job delay factor from sampled information contained in a report. The job delay factor may be a mean or median number of jobs waiting to transfer data to storage media. The system may determine daily job delay factors for a number of days in a row for a given storage cell and determine statistical patterns based on a comparison of the job delay factors.

In step 730, the system may determine an action to be performed, and the routine 700 ends. Referring back to step 620 of FIG. 6, the system determines an action based upon the comparisons described with respect to FIG. 7A, and proceeds to step 630.

Figure 7B:
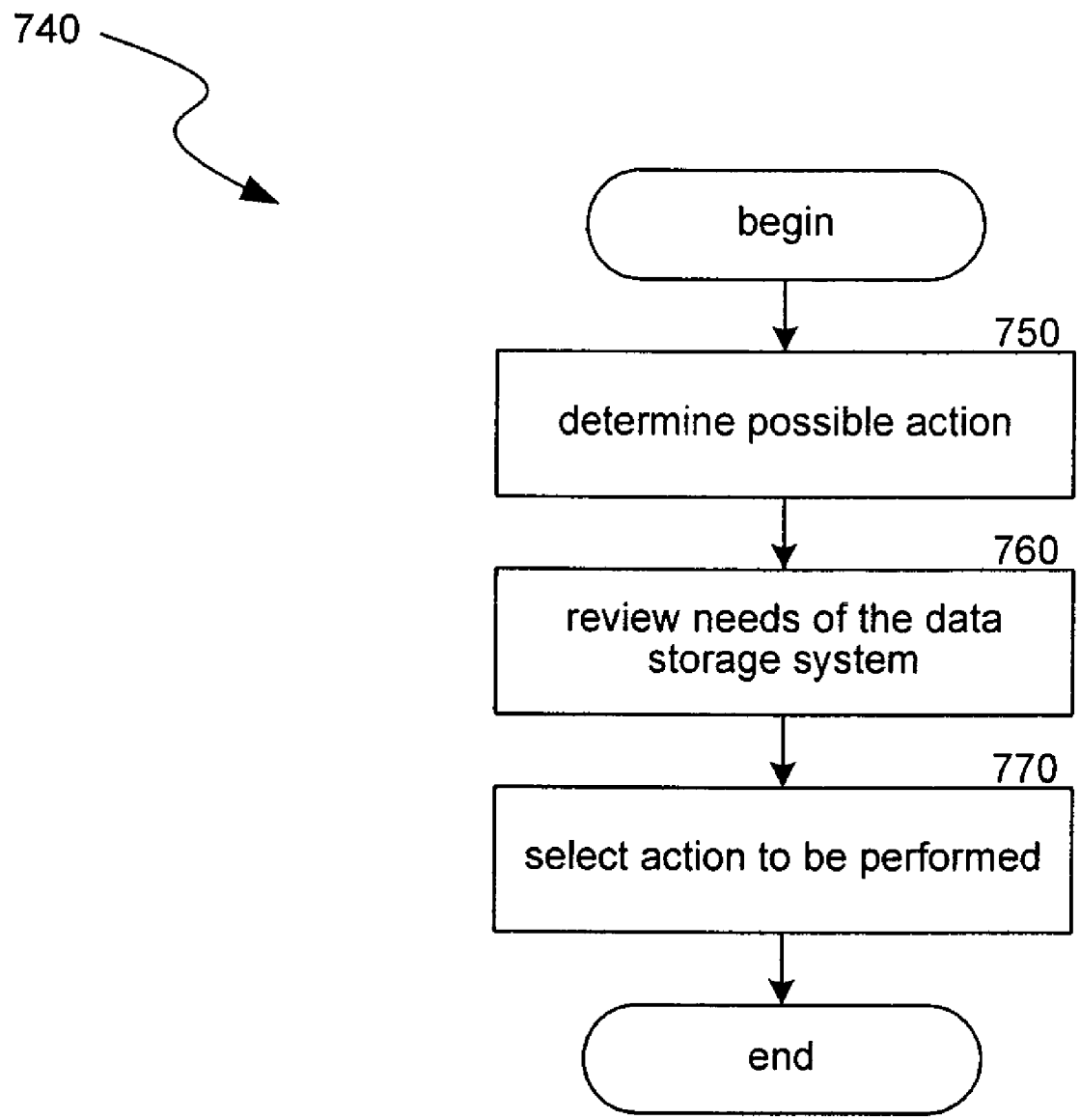
FIG. 7B is a flow diagram illustrating a routine for performing an action.

Referring to FIG. 7B, a flow diagram illustrating a routine 740 for performing an action is shown. In step 750, the system determines that an action is to be performed. The system, in step 760, reviews the needs of the storage operation. For example, the system receives information that a data store operation at a given cell will not complete in time. In step 770, the system performs a determined action. In this example, the system may transfer some of the waiting jobs at the given cell to another cell in order to complete the data store operation. In other examples, the system may determine that an action may be performed after a data store operation completes. In these cases, the system may perform actions that modify or redistribute system resources before the next scheduled data store operation.

Figure 8:
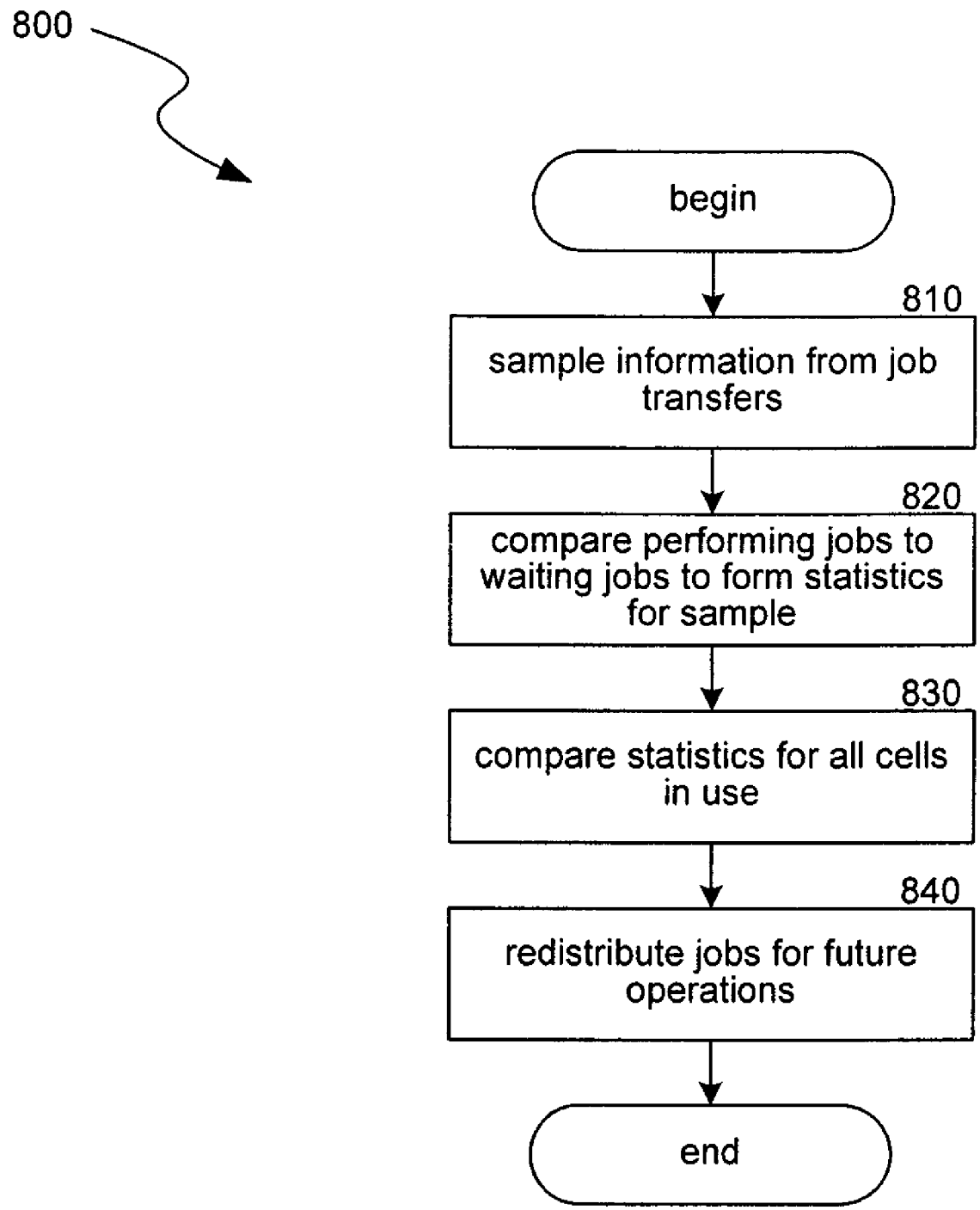
FIG. 8 is a flow diagram illustrating a routine for redistributing data transfer jobs.

Referring to FIG. 8, a flow diagram illustrating a routine 800 for redistributing data transfer jobs is shown. Routine 800 illustrates an example load redistribution based on a sampling of load statistics. In step 810, the system samples jobs information from cells used in storage operations. The system may obtain this information from the load report. In step 820, the system defines a job usage factor for each cell. In step 830, the system compares the job usage factors for each cell and determines a distribution pattern for the cells.

For example, two cells are in use for daily data stores: cell A and cell B. The system receives reports for each cell, showing job usage factors for a number of sampling periods. In this example, the reports show cell A with a job usage factor of 40 percent (2 of 5 jobs running) and cell B with a job usage factor of 100 percent (5 of 5 jobs running). Based on these statistics, the system may determine that cell B can handle 2.5 times as many jobs as cell A.

Referring back to FIG. 8, routine 800, proceeds to step 840, and redistributes jobs of future storage operations using cells A and B. For example, if the next daily data store is to transfer 140 MB of data, the system sends 100 MB to cell B and 40 MB to cell A.

In some examples, administrators may set the types of information the system samples. Administrators, or developers of the system, may define mathematical models based on their needs. Additionally, the system may use mathematical models to develop reports on a variety of different data transfer or other storage activities.

The system may model the arrival and queuing of jobs (chunks of data to be transferred) at data storage resources. The system may model, for example, a mean and/or peak waiting time for a job at a resource, comparing the mean/peak time with an average service time. The system may follow models of queueing theory, such as Poisson processes using exponential distribution, or other queueing models. For example, the system may model based on a single server service (using Poisson arrivals and service notation) and implement an M/M/1 model or an M/G/1 model (using Kendall's notation). In some cases, the system may model based on an infinite server service situation, or M/M/∞ model.

For example, using the M/M/1 model of queueing, the system models a rate of jobs claiming storage as an average arrival rate (lambda), which may be approximated by a schedule kick-off interval. The system also models an average duration time of a job (the average time it uses resources) as an average service rate (mu). Thus, according to the model, the mean number of customers, or jobs, in a system (N) may be found using the following equation:

$$N=p/(1-p), \text{ where } p=\text{lambda/mu}.$$

In other words, given an estimated arrival rate and servicing time, the system may estimate the mean number of jobs claiming for resources in the system at any given time.

In some cases, it may be beneficial for the mean number of jobs (N) to be slightly above (e.g., 10% or less) the maximum number of resources available in the system (MAX). Such a scenario may lead to maximized resource utilization while minimizing the number of idle jobs waiting for resources. The degree of resource utilization may factor into the scalability of a system as waiting processes consume valuable CPU time and overall time.

Thus, in some examples, a Load Report described herein determines how farther away from MAX a current system operates. In other words, it provides statistical information necessary to approximate and visualize "N" in a working system, such as a data storage system. More specifically, peak values determined by and available in the Load Report provide quantitative information related to an excess number of jobs waiting for resources at any given time (EXCESS). Thus, a difference between EXCESS and MAX may provide the system an indication of unnecessary loads in the system at certain times.

Therefore, in some examples, the system may adjust job schedule kick-off intervals (e.g. by spreading them out, delaying one or more, and so on) or transfer jobs from one resource to another to reduce the estimated mean number of resources the system may utilize. Thus, the system may decrease lambda in the above equation to decrease N, bringing N closer to MAX. Such an action may reduce the peak number of jobs waiting for resources (EXCESS) as well. Other formulas and techniques for the system to adjust resources and jobs are of course possible.

Global Filters

In some cases, the system uses the global manager or server to set policies for the overall system. For example, referring back to FIG. 2, there may be a many different storage and/or schedule policies set in cells 220 and 230 of the storage operations level 210. For policies used in both cells, the system may set such policies (or, filters) at the global level 250, via global manager 261. In these cases, the system pushes these filters down to the lower level storage cells. The system may push globally set filters down to one cell, a selection of cells, or all cells within a data storage system.

Figure 9:
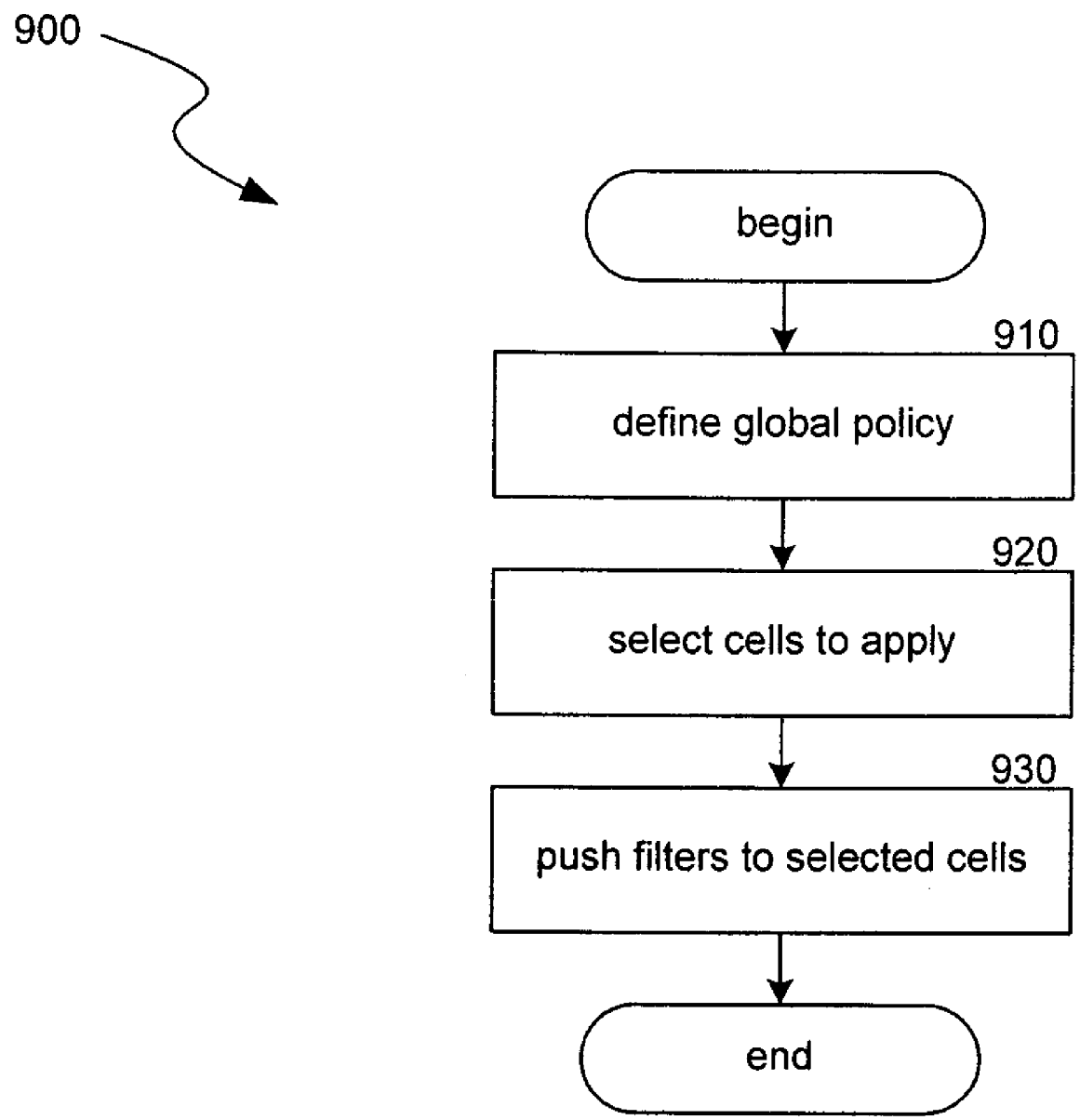
FIG. 9 is a flow diagram illustrating a routine for setting global filters.

Referring to FIG. 9, a flow diagram illustrating a routine 900 for setting global filters is shown. In step 910, a system administrator or information from the system defines a global policy, such as a storage policy or schedule policy. In some cases, the system may use information determined from the reports described above to determine the filter. In some cases, the system may use other information to determine the filter.

In step 920, the system selects where to implement, or push, the filter. In some cases, the system pushes the filter to all cells within the system. In some cases, the system selects a proper subset of the cells and pushes the filter to the proper subset of cells. In step 930, upon a selection of cells (or automatic predetermination to select all cells), the system pushes the filters to the selected cells.

Thus, the system may define policies at many servers (tens or hundreds) without actually setting the policies at each individual server. Example policies include storage policies, schedule policies, sub-client policies, and so on. Filters and policies may be modified at the cells or at the global level, and reapplied during or after storage operations (such as described above). For example, the system may use load reports to set a policy that redistributes the resources of a storage operation, and use the global filters to implement the policy.

Figure 10A:
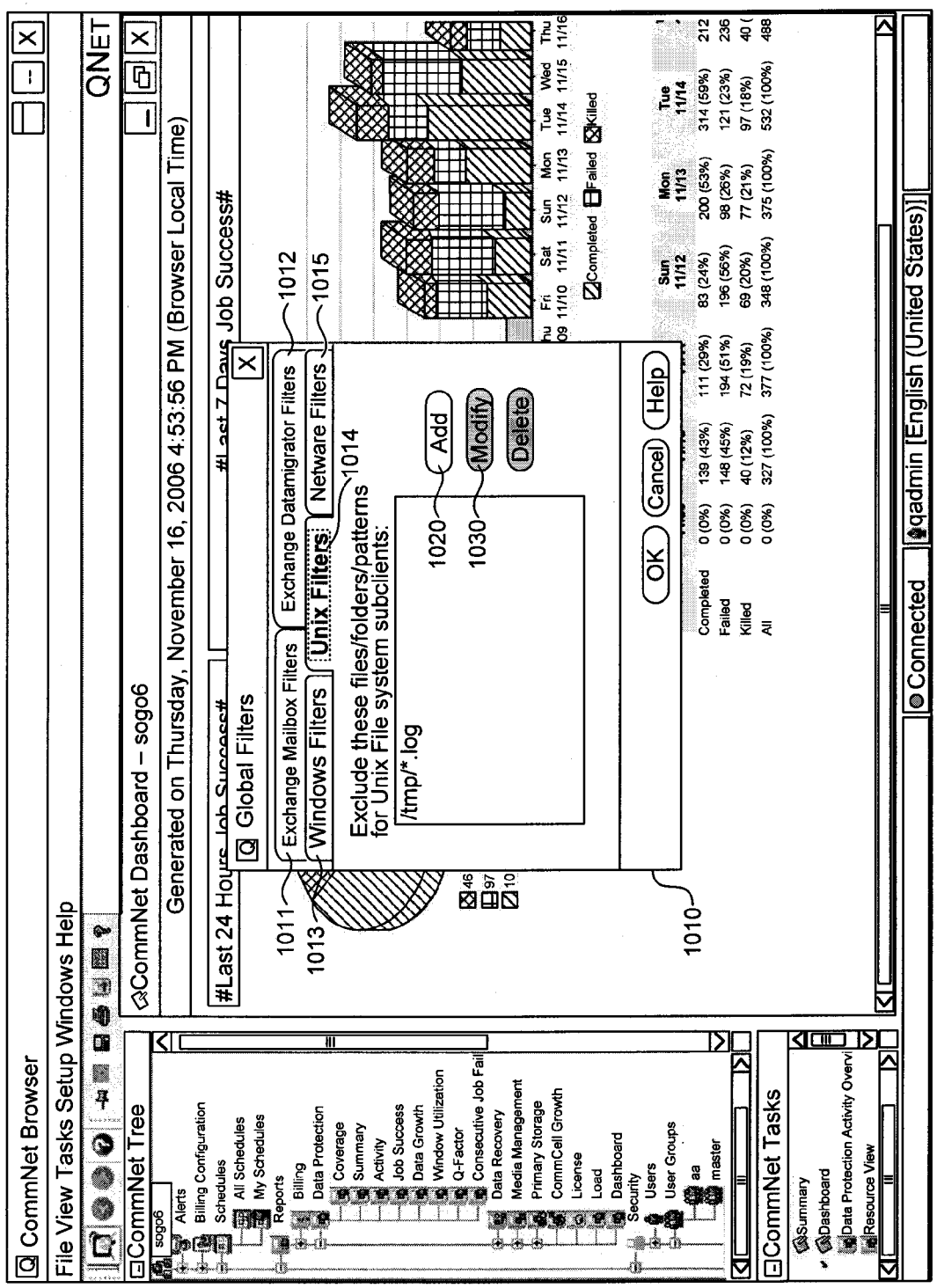
FIGS. 10A-B are example displays illustrating user interface screens reflecting global filters.
Figure 10B:
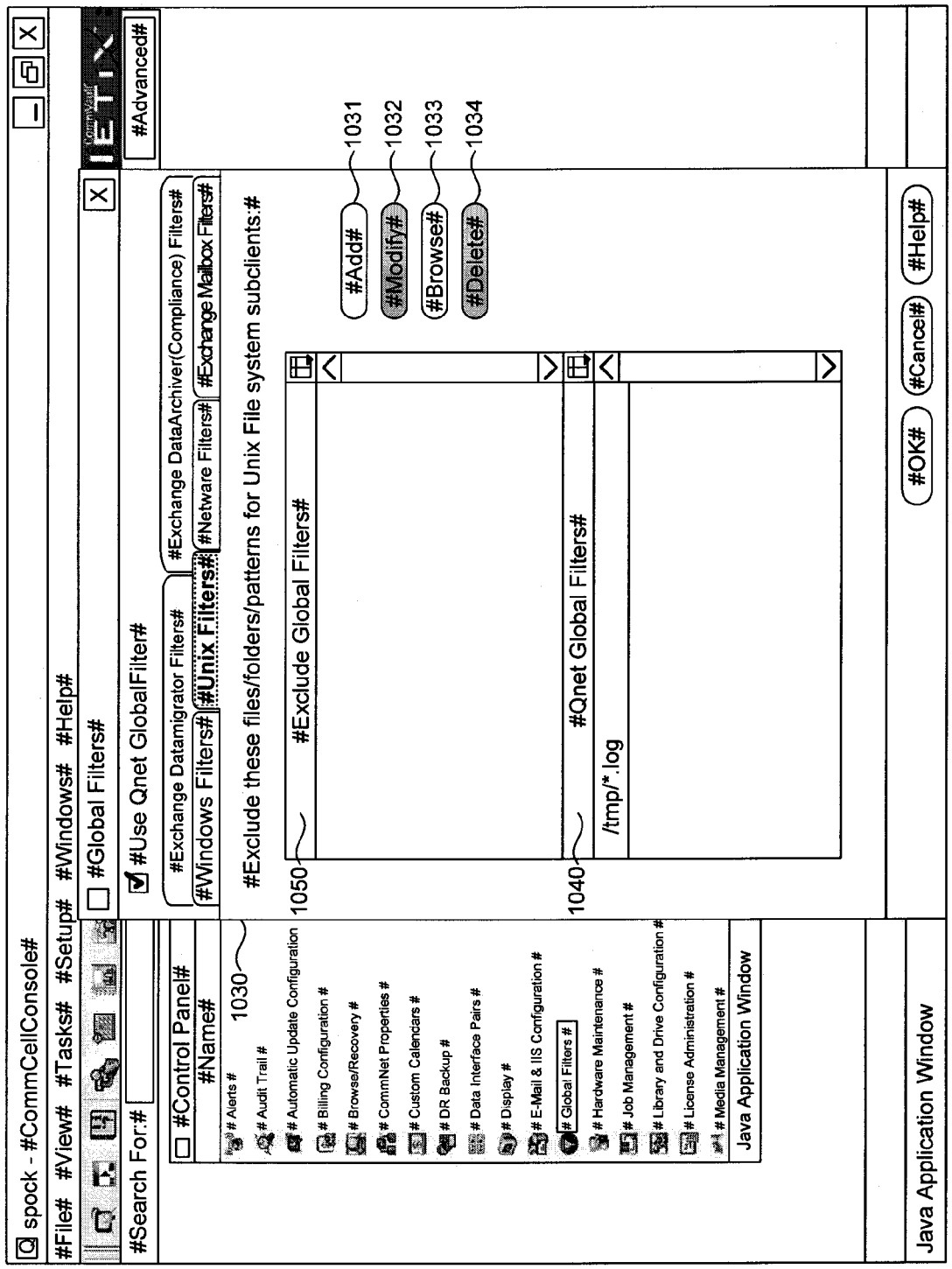

Referring to FIGS. 10A-B, displays illustrating user interface screens reflecting global filters are shown. The system may use screen 1010 to set filters for some or all components of the system. For example, a user may select window 1010 and set Exchange mailbox filters 1011, Exchange data migrator filters 1012, Windows filters 1013, Unix filters 1014, Netware filters 1015, and so on. Interface 1010 may contain buttons to add or exclude filters 1020, modify filters 1030, and so on.

Interface 1030 (FIG. 10B) is a global filter interface component at a server of the system. The system may add filters (using button 1031), modify filters (button 1032), browse available or already set filters (button 1033), delete filters (button 1034) and so on. The component enables a user to view global filters assigned to the server (via component 1040) and to selectively apply global filters at the server (via component 1050).

Thus, the system enables users to apply, delete, modify, and/or browse for global filters at a global level or at an individual server level (e.g., at a storage cell).

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for performing data storage operations that transfer data from a source to a destination, the system comprising:
a server connected in a hierarchy to two or more storage cells actively transferring data from the source to the destination, wherein the server comprises a processor, and
wherein the first storage cell is connected to and is subordinate to the server and wherein the second storage cell is connected to and is subordinate to the first storage cell; and
wherein each of the two or more storage cells comprises:
a secondary storage database configured to store secondary copies of data generated by a data storage operation;
a media agent configured to convey data produced at a client computer in order to create a secondary copy of data during a data storage operation; and,
a storage manager configured to control the media agent during a data storage operation, wherein the storage manager controls the media agent in accordance with a filter or rule applicable to the storage cell;

and wherein the server:
  generates a report related to performance of data storage operations within the two or more storage cells, wherein the report indicates results of a quantitative comparison of performances between the two or more storage cells; and
  determines a filter or rule to assign based on the generated report, wherein the filter or rule is assigned to at least one of the two or more storage cells; and,
a data transfer modification component, wherein the data transfer modification component modifies the active transfer of data from the source to the destination based in part on the assigned filter or rule.

2. The system of claim 1, wherein the report comprises results of a quantitative comparison of job usage between the two or more storage cells.

3. The system of claim 1, wherein the report comprises results of a quantitative comparison of job delay between the two or more storage cells.

4. The system of claim 1, wherein the quantitative comparison compares a mean or peak waiting time for a job at a storage resource to an average service time.

5. The system of claim 1, wherein the quantitative comparison compares the arrival and queuing of jobs at different storage resources and wherein the arrival and queuing is modeled using an M/M/1 model.

6. The system of claim 1, wherein the quantitative comparison of performances between the two or more storage cells compares a number of jobs at each storage cell with a number of storage cells.

7. A system for defining a filter policy for performing data storage operations in a hierarchical data storage system, the system comprising:
  two or more data storage cells, wherein the two or more data storage cells comprise:
    a first storage cell that performs a first number of data storage jobs during a data storage operation, wherein a storage cell is configured to transfer data from a source to a destination; and
    a second storage cell, different from the first storage cell, that performs a second number of data storage jobs during the data storage operation; and
  a server configured to assign a filter policy to the first storage cell and the second storage cell, wherein the server comprises:
    a comparison component that generates a report that quantitatively compares the performed first number of jobs to the performed second number of jobs; and
    a filter assignment component that determines and assigns the filter policy to the first storage cell and the second storage cell based on the quantitative comparison of the generated report;
  wherein the server comprises a processor and is connected in a hierarchy to the two or more data storage cells,
  wherein the first storage cell is connected to and is subordinate to the server;
  wherein the second storage cell is connected to and is subordinate to the first storage cell;
  wherein each of the two or more storage cells comprises:
    a secondary storage database configured to store secondary copies of data generated by a data storage operation;
    a media agent configured to convey data produced at a client computer in order to create a secondary copy of data during a data storage operation; and,
    a storage manager configured to control the media agent during a data storage operation, wherein the storage manager controls the media agent in accordance with a filter or rule applicable to the storage cell; and,
  wherein at least one of the first and second storage cells modifies a data storage operation in accordance with the assigned filter policy.

8. The system of claim 7, wherein assigning the filter policy includes assigning a global filter policy that applies to all storage cells within the hierarchical data storage system.

9. The system of claim 7, wherein assigning the filter policy includes assigning a first filter policy that applies to the first storage cell and assigning a second filter policy at least partially different than the first filter policy to the second storage cell.

10. The system of claim 7, further comprising:
  an interface component, wherein the interface component presents the assigned filter policy to an administrator of the hierarchical data storage system.

* * * * *